United States Patent
Luo et al.

(10) Patent No.: US 8,882,986 B2
(45) Date of Patent: Nov. 11, 2014

(54) SYSTEM AND METHOD FOR METAL DEBURRING

(75) Inventors: Yuefeng Luo, Mechanicville, NY (US); William Edward Adis, Scotia, NY (US); Michael Lewis Jones, Scotia, NY (US)

(73) Assignee: General Electric Company, Schenectady, NY (US)

( * ) Notice: Subject to any disclaimer, the term of this patent is extended or adjusted under 35 U.S.C. 154(b) by 792 days.

(21) Appl. No.: 13/039,295

(22) Filed: Mar. 2, 2011

(65) Prior Publication Data

US 2012/0222968 A1 Sep. 6, 2012

(51) Int. Cl.
*B23H 9/02* (2006.01)
*C25F 7/00* (2006.01)
*B23H 3/00* (2006.01)
*B23H 3/10* (2006.01)
*C25F 3/02* (2006.01)

(52) U.S. Cl.
CPC .............. *B23H 9/02* (2013.01); *B23H 2300/12* (2013.01); *C25F 7/00* (2013.01); *B23H 3/00* (2013.01); *B23H 3/10* (2013.01); *C25F 3/02* (2013.01)
USPC ...................... 205/658; 204/228.7; 204/275.1

(58) Field of Classification Search
CPC ........ B23H 9/02; B23H 2300/12; B23H 3/10; C25F 3/16
USPC .............................. 204/228.7, 275.1; 205/658
See application file for complete search history.

(56) References Cited

U.S. PATENT DOCUMENTS

| | | | |
|---|---|---|---|
| 2,590,927 A * | 4/1952 | Brandt et al. ................. | 205/679 |
| 3,468,775 A * | 9/1969 | Lanning et al. ............... | 205/644 |
| 3,803,014 A | 4/1974 | Atkinson | |
| 4,482,445 A | 11/1984 | Fjelstad | |
| 6,402,931 B1 * | 6/2002 | Zhou et al. .................... | 205/659 |
| 2010/0072077 A1 * | 3/2010 | Rohrbeck ...................... | 205/670 |

FOREIGN PATENT DOCUMENTS

| | | |
|---|---|---|
| WO | 94/29061 A1 | 12/1994 |
| WO | 9429061 | 12/1994 |

OTHER PUBLICATIONS

Search Report issued in connection with GB Application No. 1243457.5, May 25, 2012.

* cited by examiner

*Primary Examiner* — Nicholas A Smith
(74) *Attorney, Agent, or Firm* — Fletcher Yoder P.C.

(57) ABSTRACT

A system includes an electrolytic deburring tool, which includes a first electrode configured to be positioned at a first gap away from a first edge of a workpiece, a second electrode configured to be positioned at a second gap away from a second edge of the workpiece, a first electrolyte supply configured to flow a first electrolyte through the first gap between the first electrode and the first edge of the workpiece, a second electrolyte supply configured to flow a second electrolyte through the second gap between the second electrode and the second edge of the workpiece, and a power supply configured to flow an alternating current through the first gap and the second gap to cause electrolytic dissolution through the workpiece from both the first edge and the second edge.

20 Claims, 6 Drawing Sheets

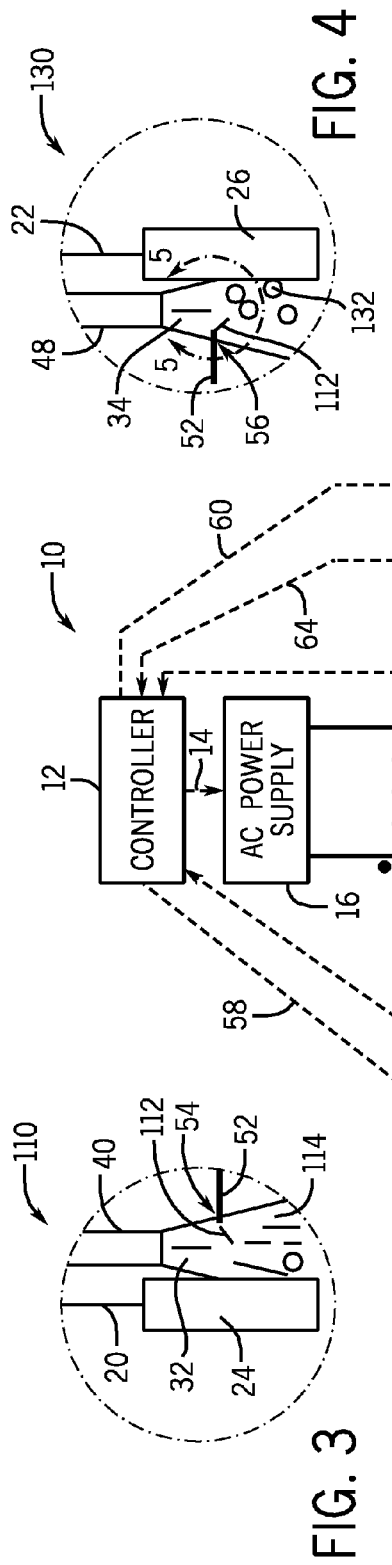
FIG. 3
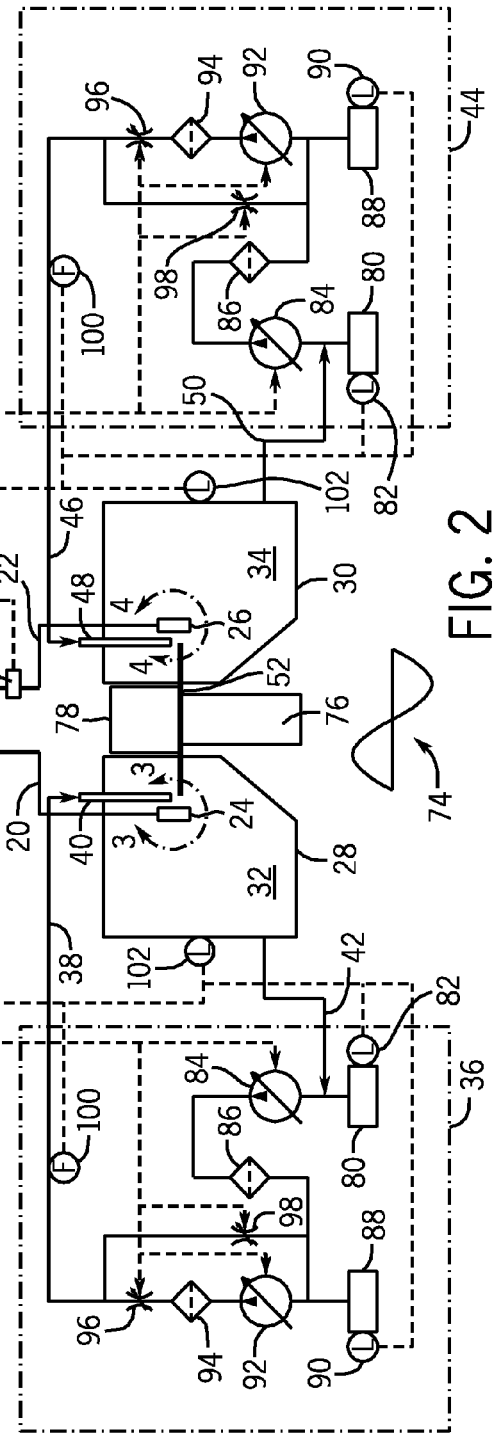
FIG. 4
FIG. 2

SYSTEM AND METHOD FOR METAL DEBURRING

BACKGROUND OF THE INVENTION

The subject matter disclosed herein relates to metal deburring, and, more particularly, to electrolytic deburring.

Electrical generators may be used in power plants, cogeneration plants, vehicles, or wherever energy is converted into electrical energy. For example, a steam turbine uses steam to generate rotary motion that drives an electrical generator. Thin sheets of metal plates, referred to as laminations, may be used in cores of electrical generators and other electrical equipment to reduce parasitic eddy currents. The laminations may be cut or stamped from a roll of sheet metal, or other types of thin metal. Such production processes may result in the formation of burrs along the edges of the laminations. Unfortunately, existing methods of deburring may be time-consuming, imprecise, costly, and difficult because of the thinness of the laminations and surface insulation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an electrolytic deburring tool, which includes a first electrode configured to be positioned at a first gap away from a first edge of a workpiece, a second electrode configured to be positioned at a second gap away from a second edge of the workpiece, a first electrolyte supply configured to flow a first electrolyte through the first gap between the first electrode and the first edge of the workpiece, a second electrolyte supply configured to flow a second electrolyte through the second gap between the second electrode and the second edge of the workpiece, and a power supply configured to flow an alternating current through the first gap and the second gap to cause electrolytic dissolution through the workpiece from both the first edge and the second edge.

In a second embodiment, a method includes flowing a first electrolyte through a first electrolyte supply across a first gap between a first electrode and a first edge of a workpiece, flowing a second electrolyte through a second electrolyte supply across a second gap between a second electrode and a second edge of the workpiece, and flowing an alternating current across the first gap and the second gap to cause electrolytic dissolution of the workpiece at both the first edge and the second edge.

In a third embodiment, a system includes an electrolytic deburring controller configured to control an alternating current through a first gap between a first edge of a workpiece and a first electrode and a second gap between a second edge of the workpiece and a second electrode to cause electrolytic dissolution of the workpiece at both the first edge and the second edge.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a schematic view of an electrolytic deburring tool according to an embodiment;

FIG. 3 is a schematic view of electrolytic dissolution of a workpiece at a transient cathode according to an embodiment;

FIG. 4 is a schematic view of electrolytic purging of a workpiece at a transient anode according to an embodiment;

DETAILED DESCRIPTION OF THE INVENTION

Figure 1:
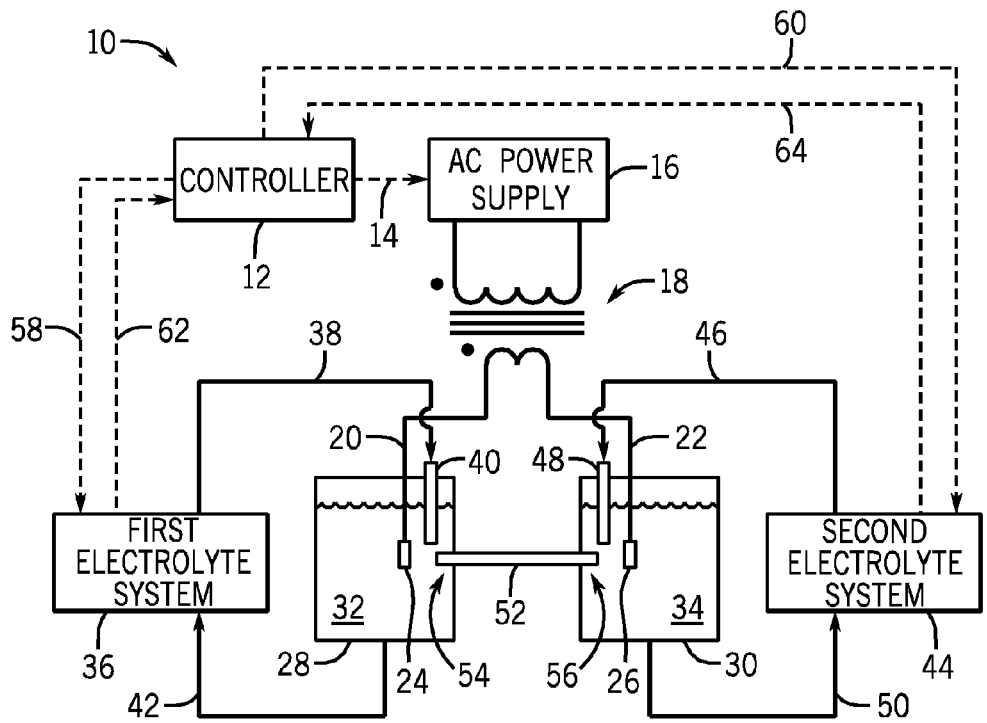
FIG. 1 is a schematic view of an electrolytic deburring tool according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for electrolytic deburring of various workpieces, such as sheets, plates, generally flat structures, generally curved structures, or any other structures of uniform or non-uniform thickness. In particular, the electrolytic deburring techniques apply a first flow of a first electrolyte to a first gap between a first electrode and a first edge of the workpiece, thereby dissolving burrs from the first edge of the workpiece. Similarly, the electrolytic deburring techniques apply a second flow of a second electrolyte to a second gap between a second electrode and a second edge of the workpiece, thereby dissolving burrs from the second edge of the workpiece. In these techniques, a power supply flows an alternating current through the first and second gaps to cause electrolytic dissolution through the workpiece from both the first edge and the second edge. A lamination of an electrical generator is one example of the workpiece that may be electrolytically deburred by the disclosed embodiments. Laminations may be used in electrical generators, in various electromagnets used in motors, transformers, and so forth, and in other electrical equipment. Such laminations may be coated to provide for interlaminate electrical insulation.

In addition, the number, geometry, and configuration of laminations may vary from one application to another. The laminations may be cut in a variety of shapes to accommodate the particular geometry within the electrical generator or other electrical equipment. Typical cutting processes produce edges of the laminations that include burrs, which are raised edges or small pieces of metal that remain attached because of the cutting process. Edges that are substantially free of burrs may help prevent possible damage to the electrical generator, reduce the introduction of debris into the electrical generator, and/or help reduce electrical shorts. Typical deburring processes may subsequently remove the burrs from the laminations, but these processes introduce additional steps and costs into the production of laminations. For example, the laminations may be recoated and cleaned after sand belt deburring. In addition, these deburring processes may be difficult to use with laminations with complicated shapes.

The presently disclosed embodiments employ electrolytic deburring to avoid the disadvantages of other deburring methods, such as sand belt deburring. For example, electrolytic deburring produces edges that are essentially free of burrs and laminations that are clean. In addition, no second step of recoating is necessary because non-metallic coatings are unaffected by electrolytic deburring. The work-hardening, warpage, and/or edge stress associated with other deburring processes may not be present in electrolytic deburring. Moreover, electrolytic deburring may produce accurate and repeatable deburring without tool wear or replacement, as with sand belt deburring. In addition, the higher quality of the deburred laminations may enable production of thinner laminations and/or higher stacking factors. Furthermore, electrolytic deburring may be less costly than other deburring methods and may be used with laminations with complicated shapes. Thus, electrolytic deburring is ideally suited for deburring laminations for electrical generators and other electrical equipment.

FIG. 1 is a schematic view of an electrolytic deburring tool 10 according to an embodiment. The electrolytic deburring tool 10 includes a controller 12 that generates a power supply signal 14 that is sent to an alternating current (AC) power supply 16. The AC power supply 16 generates AC at a particular frequency, current, and voltage. In certain embodiments, the frequency of the AC may be less than approximately 1000 Hertz, 750 Hertz, or 500 Hertz. At greater frequencies, the skin effect associated with AC may cause the effective resistance of conductors in the electrolytic deburring tool 10 to increase. In certain embodiments, the current and/or voltage of the AC generated by the AC power supply 16 may be adjustable. Thus, the power supply signal 14 from the controller 12 may be used to specify the desired frequency, current, and/or voltage of the AC produced by the AC power supply 16. In further embodiments, the AC from the AC power supply 16 passes through a transformer 18, which may be used to change the voltage and/or current of the AC. For example, the transformer 18 may step down the voltage supplied by the AC power supply 16. In other embodiments, the transformer 18 may be omitted or included in the AC power supply 16.

In the illustrated embodiment, a first AC power wire 20 and a second AC power wire 22 are connected to the transformer 18. The first and second AC power wires 20 and 22 supply the AC to a first electrode 24 and a second electrode 26, respectively. When the AC flows toward the first or second electrodes 24 and 26, the electrodes function as a transient cathode. When AC flows away from the first and second electrodes 24 and 26, the electrodes function as a transient anode. Thus, as the AC alternately flows toward and away from the first and second electrodes 24 and 26, the electrodes alternately function as the transient cathode and the transient anode. In other words, the first electrode 24 functions as the transient cathode for approximately half of the time and as the transient anode for the other half of the time. Similarly, the second electrode 26 functions as the transient cathode for approximately half of the time and as the transient anode the other half of the time. Further, when the first electrode 24 functions as the transient cathode, the second electrode 26 functions as the transient anode. Similarly, when the first electrode 24 functions as the transient anode, the second electrode 26 functions as the transient cathode. The first and second electrodes 24 and 26 may be made from materials such as, but not limited to, graphite, titanium, niobium, or combinations (alloys) thereof. In addition, the first and second electrodes 24 and 26 may be inert. In other words, the first and second electrodes 24 and 26 may not dissolved when the electrodes function as the transient anode.

The first electrode 24 is located in a first electrolyte tank 28. Similarly, the second electrode 26 is located in a second electrolyte tank 30. The first and second electrolyte tanks 28 and 30 may be made from non-conductive materials such as, but not limited to, plastic, to help prevent current leakage through grounding connections. The first electrolyte tank 28 contains a first electrolyte 32, and the second electrolyte tank 30 includes a second electrolyte 34. As described in detail below, the first and second electrolytes 32 and 34 carry the AC. Examples of materials that may be used as the first and second electrolytes 32 and 34 include, but are not limited to, sodium nitrate, sodium chloride, or a combination (mixture) thereof. In certain embodiments, the first and second electrolytes 32 and 34 may be the same. In other embodiments, the first and second electrolytes 32 and 34 may be different from one another.

Coupled to the first electrolyte tank 28 is a first electrolyte system 36. As described in detail below, the first electrolyte system 36 includes various components to store, transfer, filter, and control a flow rate or pressure of the first electrolyte 32, as discussed in detail below. Examples of such components include pumps, motors, filters, piping, valves, sensors, and so forth. A first electrolyte supply 38 (e.g., conduit) is coupled to the discharge of the first electrolyte system 36 to carry the first electrolyte 32 to the first electrolyte tank 28. In certain embodiments, a first electrolyte nozzle 40 may be coupled to an end of the first electrolyte supply 38. The first electrolyte nozzle 40 may be configured to focus the flow of the first electrolyte 32 to a particular location in the first electrolyte tank 28. In other embodiments, the first electrolyte nozzle 40 may be omitted. Both the first electrolyte supply 38 and the first electrolyte nozzle 40 may be made from non-conductive materials similar to that used for the first electrolyte tank 28. A first electrolyte return 42 (e.g., conduit) may be coupled to an outlet of the first electrolyte tank 28. The first electrolyte return 42 carries the first electrolyte 32 to the first electrolyte system 36. The first electrolyte return 42 may also be made from non-conductive materials similar to that used for the first electrolyte supply 38. As shown in FIG. 1, the first electrolyte 32 flows in a loop between the first electrolyte tank 28 and the first electrolyte system 36.

A second electrolyte system 44 may be coupled to the second electrolyte tank 30. Examples of components that may be included in the second electrolyte system 44 include, but are not limited to, pumps, motors, filters, piping, valves, sensors, and so forth. The configuration of the second electrolyte system 44 and of the second electrolyte loop 34 may be similar to that of the first electrolyte loop 32. Specifically, the second electrolyte 34 flows from the second electrolyte system 44 through a second electrolyte supply 46 (e.g., conduit) and then to a second electrolyte nozzle 48 in certain embodiments. The second electrolyte 34 then flows from the second electrolyte tank 30 through a second electrolyte return 50 (e.g., conduit) to the second electrolyte system 44. As with the first electrolyte system 36, the various components of the second electrolyte system 44 and the components coupled to the system 44 may be made from non-conductive materials such as, but not limited to, plastic.

A workpiece 52 may be disposed between the first and second electrolyte tanks 28 and 30. Specifically, a first edge 54 of the workpiece 52 is exposed to the first electrolyte 32 and a second edge 56 of the workpiece 52 is exposed to the second electrolyte 34. As described in detail below, the system 10 may include a barrier adjacent the workpiece 52 to prevent any mixing of the first and second electrolytes 32 and 34. The first and second edges 54 and 56 of the workpiece 52 may be portions of the workpiece that need to be deburred. For example, the workpiece 52 may be a lamination for an electrical generator, motor, transformer, or other type of electrical equipment.

The controller 12 may be configured to receive and send various signals to control the electrolytic deburring tool 10. For example, the controller 12 may generate a first electrolyte control signal 58 that is sent to the first electrolyte system 36. The first electrolyte control signal 58 may include various instructions for controlling the components of the first electrolyte system 36. Similarly, the controller 12 may generate a second electrolyte control signal 60 that is sent to the second electrolyte system 44. In addition, the first electrolyte system 36 may generate a first electrolyte sensor signal 62 that is sent to the controller 12. The first electrolyte sensor signal 62 may convey information regarding various sensors included in the first electrolyte system 36. Similarly, the second electrolyte system 44 may generate a second electrolyte sensor signal 64 that is sent to the controller 12. For example, the controller 12 may send signals 58 and 60 and receive signals 62 and 64 to control the speed of a pump or the concentration of the electrolytes 32 and 34 in the first and second electrolyte systems 36 and 44. Additionally, the controller 12 may control the frequency of power from the AC power supply 16.

FIG. 2 is a schematic view of the electrolytic deburring tool showing further details of the first and second electrolytic systems 36 and 44 according to an embodiment. In the illustrated embodiment, a current sensor 70 may be disposed in either the first or second AC power wires 20 or 22. The current sensor 70 may generate a current signal 72 that is sent to the controller 12. Based on the information conveyed by the current signal 72, the controller 12 may adjust the AC power signal 14 sent to the AC power supply 16 to adjust the AC flowing to the first and second electrodes 24 and 26. A shape 74 of the AC is shown in FIG. 2. The shape 74 may be sinusoidal, as shown in FIG. 2, or square-shaped or a bipolar rectangle wave in other embodiments.

Located below the workpiece 52 is a base 76, which may be made from a non-conductive material similar to that used in the first and second electrolyte systems 36 and 44. The base 76 is used to support the workpiece 52 during electrolytic deburring. Located above the workpiece 52 is an insulator block 78, which may be made from a non-conductive material. As the workpiece 52 may be thin, the insulator block 78 and the base 76 help to support the workpiece 52 and keep the workpiece 52 flat during the electrolytic deburring. As discussed in detail below, barriers may be disposed between the base 76 and the insulator block 78 to help segregate the first and second electrolytes 32 and 34.

Turing to the electrolyte systems in more detail, the first electrolyte system 36 may include a return tank 80, which is used to store the first electrolyte 32 that flows through the first electrolyte return 42. As described above, all of the components of the first electrolyte system 36 described herein may be made from a non-conductive material. Coupled to the return tank 80 may be a return tank level sensor 82, which is configured to provide a signal indicating the level of the first electrolyte 32 in the return tank 80. A return tank pump 84 may be used to transfer the first electrolyte 32 out of the return tank 80, or directly from the first electrolyte tank 28. Next, the first electrolyte 32 may flow through a return tank filter 86, which is configured to remove particulates from the first electrolyte 32. The particulates in the first electrolyte 32 may include burrs and/or metal hydroxide removed from the workpiece 52. A filter element disposed in the return tank filter 86 may be configured to trap a majority of the particulates that may be generated by the electrolytic deburring tool 10. The filtered electrolyte 32 from the return tank filter 86 may then flow to a storage tank 88. Thus, filtered and unfiltered first electrolyte 32 may be segregated from one another. The storage tank 88 may include a storage tank level sensor 90, which is configured to provide a signal indicating the level of the first electrolyte 32 in the storage tank 88. A storage tank pump 92 may be used to transfer the first electrolyte 32 out of the storage tank 88 or directly from the return tank filter 86. A storage tank filter 94 may be disposed downstream of the storage tank pump 92 to remove further particulates from the first electrolyte 32. Thus, a filter element of the storage tank filter 94 may be configured to trap particles smaller than those trapped by the return tank filter 86. A control valve 96 may be disposed downstream of the storage tank filter 94 and used to control a flow rate or pressure of the first electrolyte 32. A storage tank bypass control valve 98 may be disposed downstream of the return tank filter 86 to bypass the storage tank pump 92, storage tank filter 94, and storage tank control valve 96. In other words, the return tank pump 84 may be used to transfer the first electrolyte 32 through the storage tank bypass control valve 98 and to the first electrolyte storage tank 28. Such a configuration may be used when the storage tank 88 is not being used. A first electrolyte flow sensor 100 may be disposed in the first electrolyte supply 38 and used to provide a signal indicative of the flow rate of the first electrolyte 32. Alternatively, the sensor 100 may be configured to provide a signal indicative of the pressure of the first electrolyte 32.

In the illustrated embodiment, the controller 12 sends control signals 58 to one or more of the following components: return tank pump 84, storage tank pump 92, storage tank control valve 96, and storage tank bypass control valve 98. Similarly, the first electrolyte sensor signal 62 may include signals from the return tank level sensor 82, first electrolyte flow sensor 100, and/or first electrolyte tank level sensor 102. Thus, the controller 12 may use the sensor signals 62 to generate control signals 58 to maintain certain parameters of the first electrolyte system 36 within thresholds. For example, the controller 12 may adjust storage tank control valve 96 and/or storage tank bypass control valve 98 to maintain a specified flow rate or pressure of the first electrolyte 32. Components of the second electrolyte system 44 may be identical to the components described in detail above with respect to the first electrolyte system 36 and are labeled with the same reference numerals in FIG. 2.

FIG. 3 is a schematic view of the first area 110 near the first electrode 24 within the line labeled 3-3 in FIG. 2. As shown in FIG. 3, the first electrolyte nozzle 40 directs the first electrolyte 32 against both the first electrode 24 and the first edge 54 of the workpiece 52. In addition, the first edge 54 includes a burr 112. The first electrode 24 in FIG. 3 is configured as the transient cathode. Thus, the AC flows from the AC power supply 16, through the first AC power wire 20, the first electrode 24, the first electrolyte 32, and the workpiece 52. When the first electrode 24 acts as the transient cathode, positive ions migrate from the first edge 54 to the first electrode 24 to dissolve the burr 112 into metal hydroxide particles. During dissolution of the burr 112, the first edge 54 becomes acidic as hydroxide ions 114 are depleted.

FIG. 4 is a schematic view of the second area 130 around the second electrode 26 within the line labeled 4-4 in FIG. 2. The second electrode 26 in FIG. 4 is configured as the transient anode. The inert electrode material prevents the transient anode from dissolving. Thus, the AC flows through the workpiece 52, the second electrolyte 34, the second electrode 26, the second AC power wire 22, before flowing back to the AC power supply 16. Positive ions migrate from the second electrode 26 to the second edge 56 of the workpiece 52. In addition, hydrogen bubbles 132 are generated near the second edge 56. The hydrogen bubbles 132 act to purge the surface of the second edge 56. During purging of the second edge 56, the surface of the edge 56 becomes basic as hydrogen ions are depleted. The basic condition and the generation of the hydrogen bubbles 132 during purging helps to remove organic contaminants such as, but not limited to, soil and oil, from the second edge 56.

In the next cycle of the AC, the first electrode 24 acts as the transient anode, and the second electrode 26 acts as the transient cathode. Thus, the electrolytic deburring depicted in FIG. 3 occurs at the second electrode 26, and the purging depicted in FIG. 4 occurs at the first electrode 24. As the AC continues to cycle, the first and second electrodes 24 and 26 continue to switch between being transient cathodes and transient anodes, respectively. Thus, the use of AC provides for a symmetric electrochemical configuration of the electrolytic deburring tool 10. The AC neutralizes the chemistry and surfaces associated with the first and second electrolytes 32 and 34. Thus, the AC essentially provides for a neutral chemical potential that helps to prevent electrolytic corrosion of the components of the electrolytic deburring tool 10. Alternation between the transient cathodes and transient anodes continues until the burrs 112 are removed from both the first and second edges 54 and 56. The process of electrolytic deburring produces first and second edges 54 and 56 that are clean, smooth, and essentially free of burrs 112.

Figure 5:
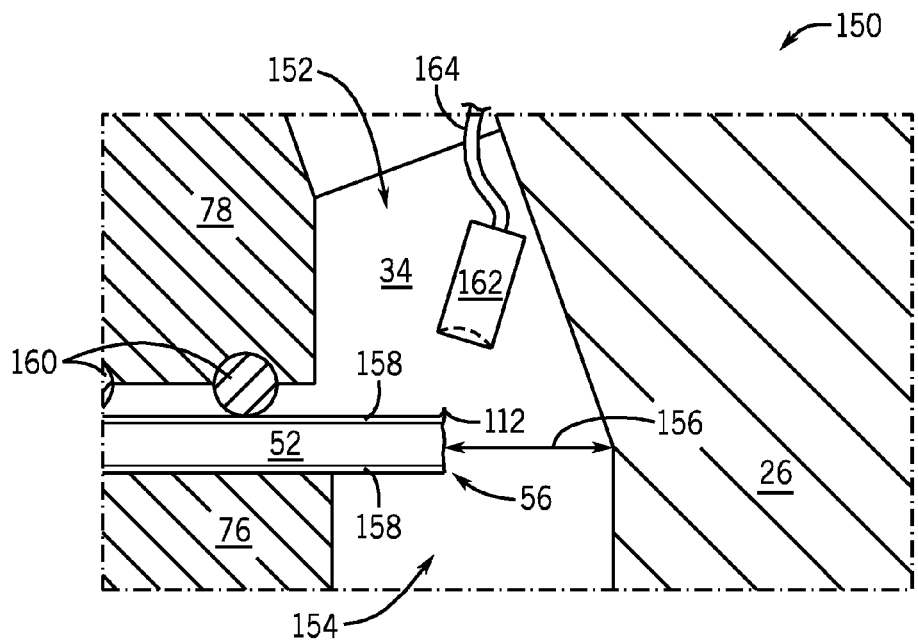
FIG. 5 is a partial cross sectional view of a barrier of an electrolytic deburring tool according to an embodiment.

FIG. 5 is a cross sectional view of the area 150 near the second edge 56 within the line labeled 5-5 in FIG. 4. The area near the first edge 54 may be similarly configured. An electrolyte inlet 152 carries the second electrolyte 34 toward the second edge 56, and an electrolyte outlet 154 carries the second electrolyte 34 away from the second edge 56. An inter-electrode gap 156 exists between the second edge 56 and the second electrode 26. A length of the inter-electrode gap 156 may be between approximately 0.1 mm to 0.8 mm, 0.2 mm to 0.6 mm, or 0.3 mm to 0.5 mm. Shorter lengths for the inter-electrode gap 156 may increase the possibility of contact between the second edge 56 and the second electrode 26, which may cause an electrical short. Longer lengths of the inter-electrode gap 156 may slow the process of electrolytic deburring. Thus, depending on the particular configuration of an application, the length of the inter-electrode gap 156 may be selected to provide efficient electrolytic deburring and yet help prevent inadvertent contact between the workpiece 52 and the first or second electrodes 24 and 26.

The upper and lower surfaces of the workpiece 52 shown in FIG. 5 are coated with a coating 158, or protective layer. As the coating 158 may be a non-conductive, or insulating, material, the electrolytic deburring is concentrated near the uncoated second edge 56. In fact, a concentration of the electrical field occurs near the second edge 56 because of the sharp geometry of the burr 112 at the second edge 56. The high local current density near the burr 112 results in quick removal of the burr 112. For example, in certain embodiments, one lamination for an electrical generator may be completely deburred in less than approximately 0.2 minutes. In addition, the resulting shape of the second edge 56 after electrolytic deburring is smooth between the two coatings 158, and may be arcuate or curved.

One or more barriers 160 may be disposed near the first and second electrolytes 32 and 34 flowing along the first and second edges 54 and 56 of the workpiece 52. Examples of barriers 160 include, but are not limited to, O-rings and seals. The barriers 160 help to prevent leakage of the first electrolyte 32 into the second electrolyte tank 20 and/or leakage of the second electrolyte 34 into the first electrolyte tank 28. The barriers 160 also help to prevent any stray electrical current between the first and second electrolyte tanks 28 and 30. Thus, the barriers 160 may be made from non-conductive materials that are compatible with the first and second electrolytes 32 and 34. Examples of materials that may be used for the barriers 160 include, but are not limited to, various engineering plastics and elastomers. In the illustrated embodiment, a deburring sensor 162 is disposed near the second edge 56 and generates a signal, which may be transmitted through a cable 164 to the controller 12. The signal from the deburring sensor 162 may indicate the progress of the electrolytic dissolution of the workpiece 52. In certain embodiments, the deburring sensor 162 may be an optical camera. For example, the controller 12 may include a model of a deburred workpiece 52. The controller 12 may then compare the image obtained by the deburring sensor 162 with the model of the deburred workpiece to determine when to end electrolytic deburring of the workpiece 52.

Figure 6:
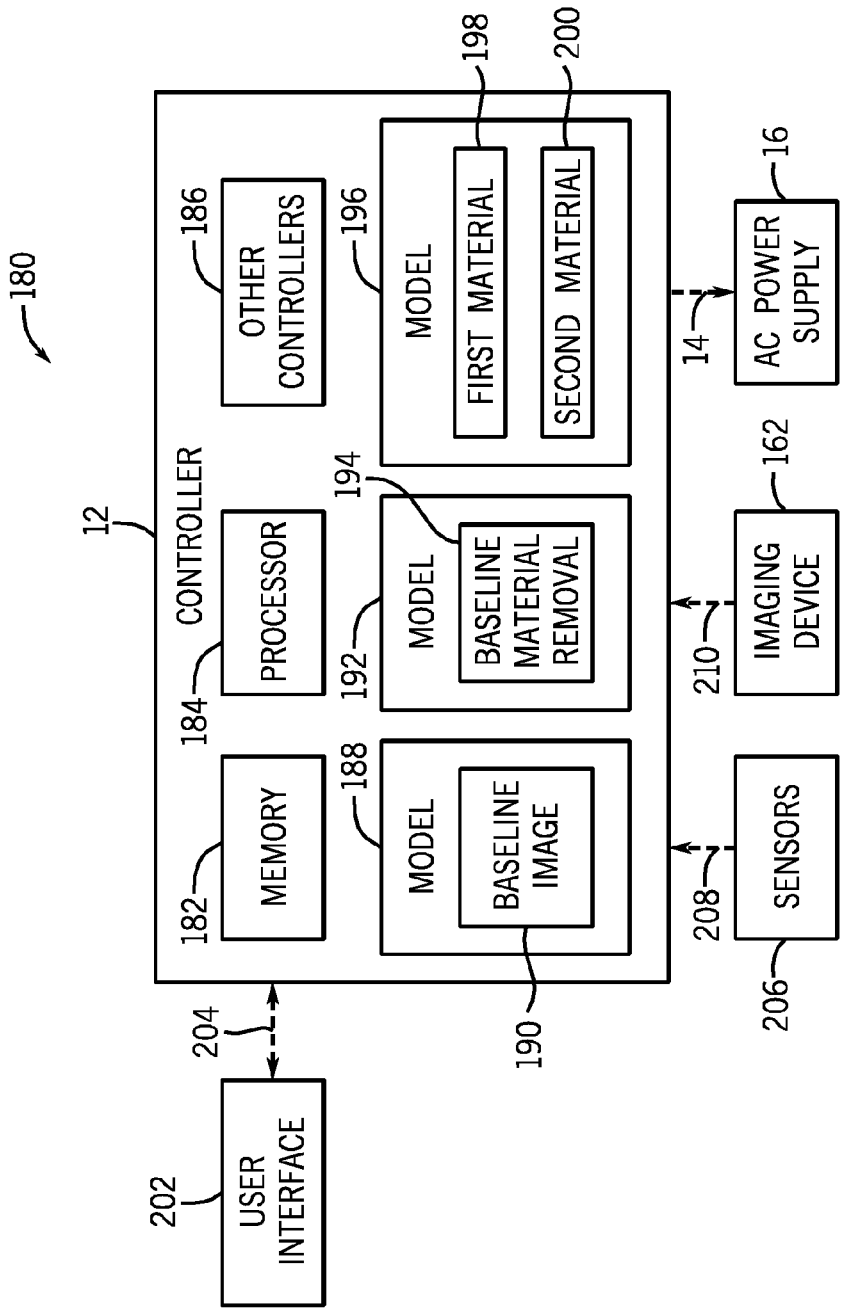
FIG. 6 is a block diagram of a controller of an electrolytic deburring tool according to an embodiment.

FIG. 6 is a block diagram of a system 180 that includes the controller 12 for the electrolytic deburring tool 10. For example, the controller 12 may include a memory 182, a processor 184, and other controllers 186 to help control the electrolytic deburring tool 10. The memory 182 may include instructions for implementing the electrolytic deburring of the workpiece 52 and/or models of a deburred workpiece 52. The processor 184 may receive sensor signals 62 and generate control signals 58. The other controllers 186 may be sub-controllers to the controller 12, or controllers that control the controller 12 and other controllers. The controller 12 may include one or more models 188, 192, and 196. Model 188 may include a baseline image 190 of the workpiece 52. The baseline image 190 may correspond to the appearance of the workpiece 52 with the burrs 112 intact. Model 192 may include a baseline material removal image 194 that corresponds to the appearance of the workpiece 52 after the burrs 112 are removed. Finally, model 196 may include a first material model 198 and a second material model 200. For example, the workpieces 52 may be made from different materials. Thus, the first material model 198 may include parameters for operating the electrolytic deburring tool 10 in a desired manner for the first material (e.g., frequency of AC, flow rate or pressure of the electrolytes 32 and 34, distance of inter-electrode gap 156, etc.). Similarly, the second material model 200 may include parameters for the second material. The model 196 may include additional models as necessary to accommodate the various materials used for the workpieces 52. Thus, the controller 12 may be configured to deburr workpieces 52 made from a variety of different materials and in different shapes and configurations.

In the illustrated embodiment, the system 180 includes a user interface 202 that may be used to interface with the controller 12. User interface signals 204 may be sent to and from the user interface 202 and the controller 12. For example, the user interface 202 may enable a user to provide instructions to the controller 12 or for the controller 12 to provide information regarding the progress of the electrolytic deburring to the user. The system 180 may also include various sensors 206, which may send signals 208 indicative of the electrolytic deburring to the controller 12. The system 180 may further include the deburring sensor 162, such as an optical camera, which sends images 210 or other data to the controller 12. Finally, the controller 12 is configured to send power supply signals 14 to the AC power supply 16, as described in detail above.

Figure 7:
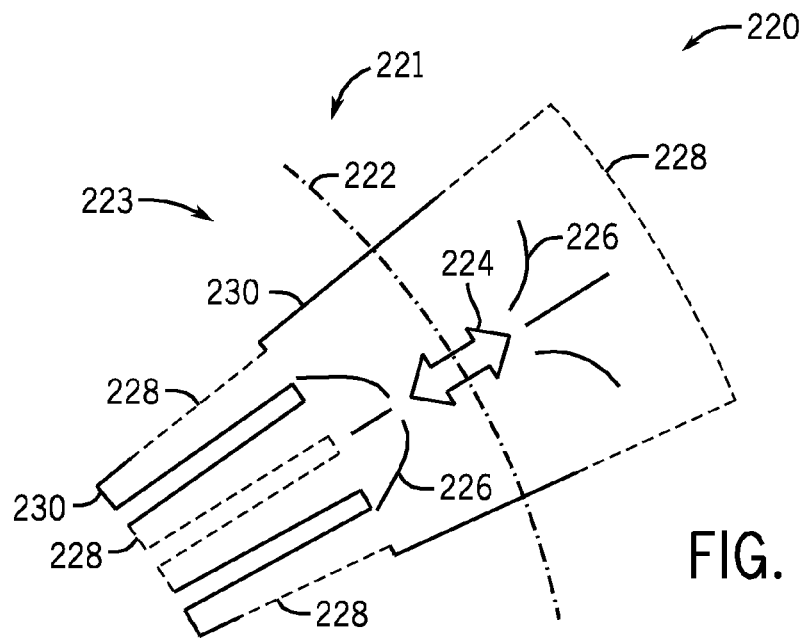
FIG. 7 is a schematic view of a flow of alternating current through a lamination according to an embodiment.
Figure 8:
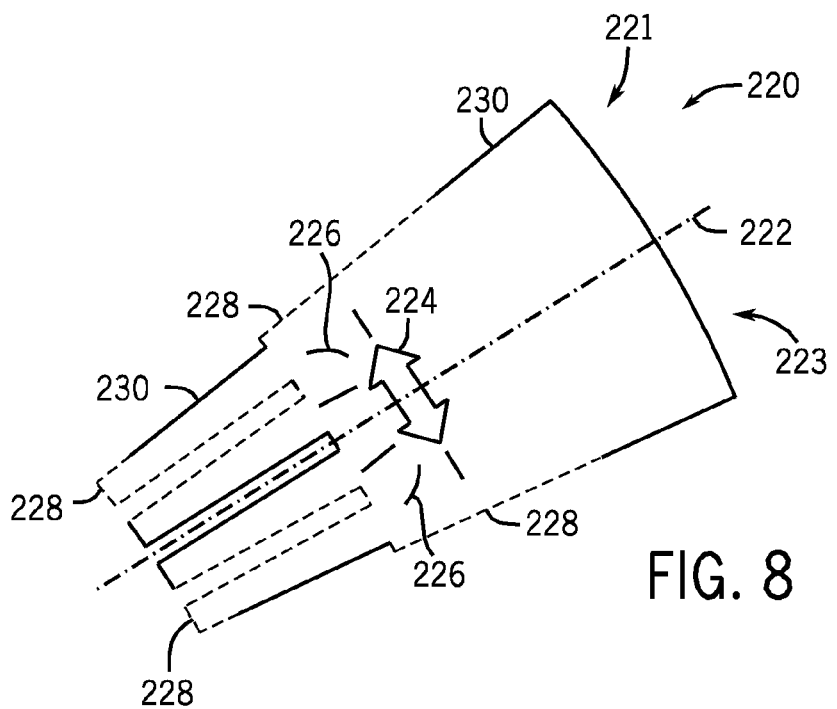
FIG. 8 is a schematic view of a flow of alternating current through a lamination according to an embodiment.

FIG. 7 is a top view of a lamination 220 being electrolytically deburred. The lamination 220 may be used in electrical generators or other electrical equipment. Burrs are formed on the edges of the lamination 220 during the stamping or blanking process used to make the laminations 220. As shown in FIGS. 7 and 8, the edges of the lamination 220 are deburred in a two-step process because of the complexity of the lamination 220. During electrolytic deburring, the AC alternately conducts from one side of the lamination 220 to the other. However, not all of the edges of the lamination 220 may be electrolytically deburred at one time because of the complexity of the lamination 220. As shown in FIG. 7, a barrier 222 divides the lamination 220 into a first portion 221 and a second portion 223. The first portion 221 may be exposed to the first electrolyte 32, and the second portion 223 may be exposed to the second electrolyte 34. The barrier 222 helps to prevent the first and second electrolytes 32 and 34 from contacting one another. An arrow 224 shows how the AC conducts back and forth across the barrier 222 through the lamination 220. The AC conducts throughout the lamination 220 as indicated by lines 226. An exposed portion 228 of the lamination 220 is in contact with the first and second electrolytes 32 and 34. Unexposed edges 230 are kept dry and are not in contact with the electrolytes 32 and 34. For example, the unexposed edges 230 may be covered with plastic or another non-conductive material. Thus, only the exposed edges 228 are electrolytically deburred. The length of the exposed edge 228 on the first portion 221 of the lamination 220 is approximately the same as the length of the exposed edge 228 on the second portion 223 of the lamination 220. Thus, both the first and second portions 221 and 223 of the lamination 220 draw approximately the same amount of AC from the AC power supply 16 during the electrolytic deburring. As shown in FIG. 7, the exposed edges 228 need not be continuous.

FIG. 8 shows a top view of the lamination 220 being electrolytically deburred in an alternate configuration. Specifically, the orientation of the barrier 222 is approximately perpendicular to the orientation of the barrier 222 shown in FIG. 7. Accordingly, the direction of the AC as indicated by arrow 224 is also approximately perpendicular to that shown in FIG. 7. As shown in FIG. 8, the exposed edges 228 correspond to the unexposed edges 230 shown in FIG. 7. Similarly, the unexposed edges 230 in FIG. 8 correspond to the exposed edges 228 shown in FIG. 7. Thus, by using the two-step process shown in FIGS. 7 and 8, all of the edges of the lamination 220 may be electrolytically deburred, even if the shape of the lamination 220 is complicated.

Figure 9:
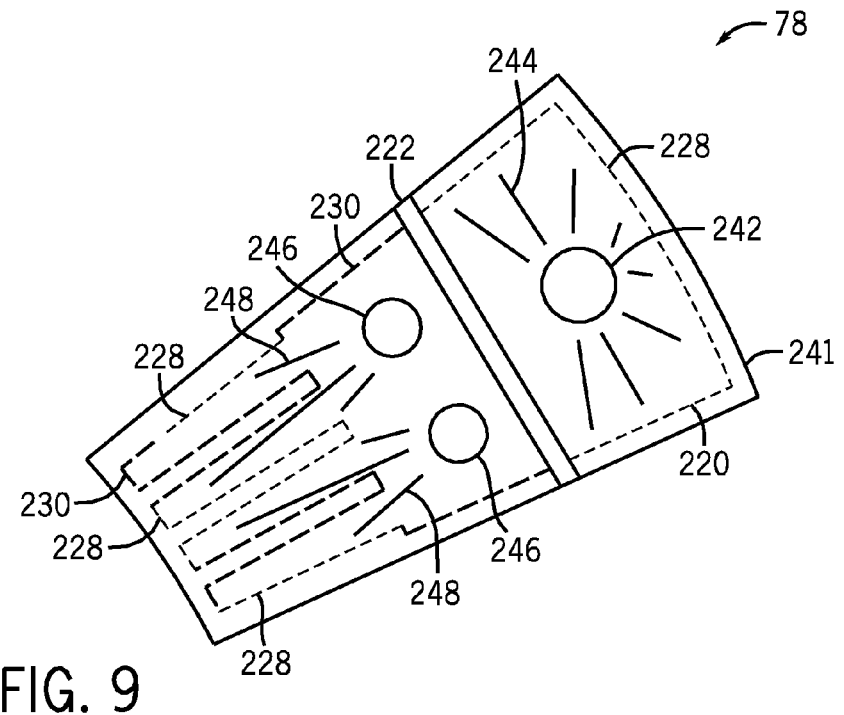
FIG. 9 is a schematic view of a flow of a first electrolyte and a second electrolyte over a lamination according to an embodiment.

FIG. 9 shows the configuration of the insulator block 78 corresponding to the flow of AC shown in FIG. 7. Specifically, the outline of the insulator block 78 is indicated by line 241. The first electrolyte 32 is directed to the lamination 220 through a first electrolyte inlet 242, which is an opening in the insulator block 78. The first electrolyte 32 then flows outward toward the exposed edges 228 along the lines indicated by 244. Channels or manifolds along the lines 244 may be used to direct the first electrolyte 32 to the exposed edges 228. Similarly, the second electrolyte 34 passes through a second electrolyte inlets 246, which are other openings in the insulator block 78. The second electrolyte 34 flows toward the exposed edges 228 along lines indicated by 248, which may also correspond to channels or manifolds in the insulator block 78. The barrier 222 maintains the separation of the first and second electrolytes 32 and 34. Thus, the first and second electrolytes 32 and 34 flow evenly toward the exposed edges 228 of the lamination 220 located under the insulator block 78.

Figure 10:
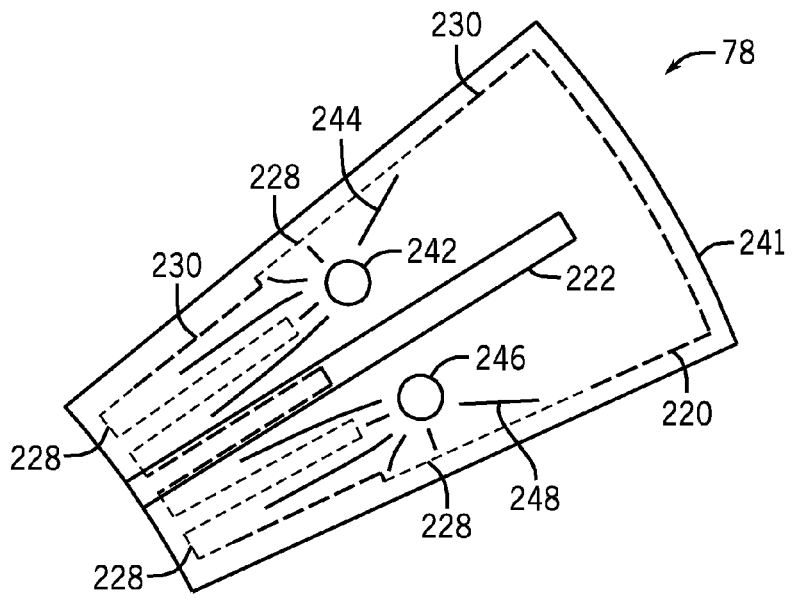
FIG. 10 is a schematic view of flow of a first electrolyte and a second electrolyte over a lamination according to an embodiment.

FIG. 10 shows the configuration of the insulator block 78 corresponding to the flow of AC shown in FIG. 8. Specifically, the orientation of the barrier 222 is approximately perpendicular to the orientation of the barrier 222 shown in FIG. 9. The first electrolyte 32 flows through the first electrolyte inlet 242 and the second electrolyte flows through the second electrolyte inlet 246. As shown in FIG. 10, the exposed edges 228 correspond to the unexposed edges 230 shown in FIG. 9. Similarly, the unexposed edges 230 in FIG. 10 correspond to the exposed edges 228 shown in FIG. 9. Thus, by using the two-step process shown in FIGS. 9 and 10, all of the edges of the lamination 220 may be electrolytically deburred.

Figure 11:
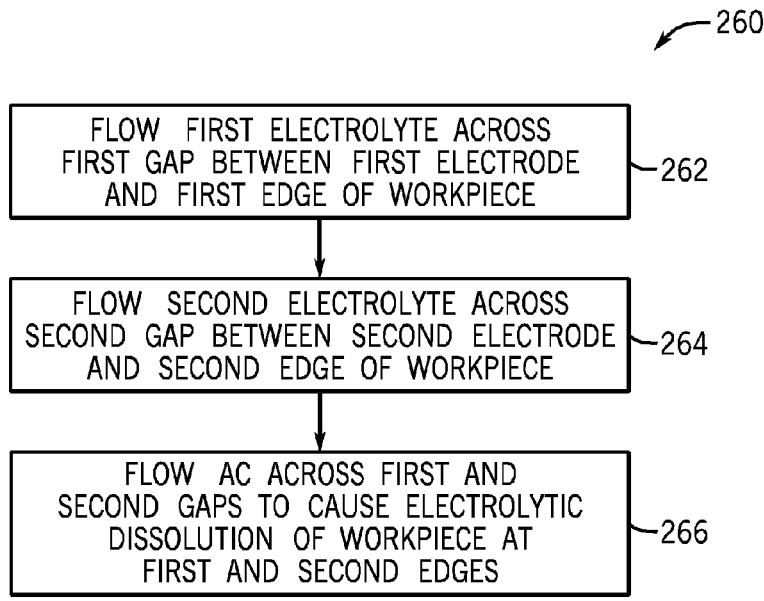
FIG. 11 is a flow chart of a process for electrolytically deburring a workpiece.

FIG. 11 is a flow chart of a process 260 for electrolytic deburring. In a first step 262, the first electrolyte 32 flows across the first gap between the first electrode 24 and the first edge 54 of the workpiece 52. In a second step 264, the second electrolyte 34 flows across the second gap between the second electrode 26 and the second edge 56 of the workpiece 52. In certain embodiments, the first and second steps 262 and 264 may take place simultaneously. In a third step 266, AC flows across the first and second gaps to cause electrolytic dissolution of the workpiece 56 at the first and second edges 54 and 56.

Figure 12:
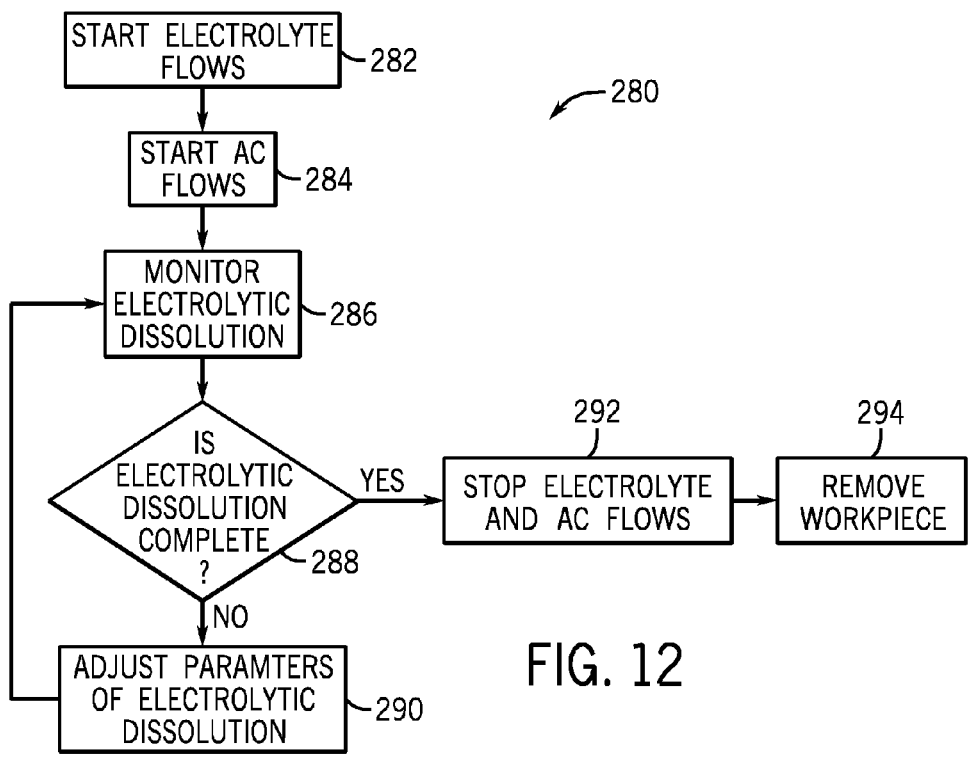
FIG. 12 is a flow chart of a process for controlling an electrolytic deburring tool.

FIG. 12 shows a flow chart of a process 280 that may be used to control and monitor the progress of the electrolytic deburring. Before proceeding, the workpiece 52 is placed in the electrolytic deburring tool 10, for example between the insulator block 78 and the base 76. Next, in a first step 282, the controller 12 starts the flow of the first and second electrolytes 32 and 34 across the workpiece 52 by sending control signals 58 and 60 to the first and second electrolyte systems 36 and 44. In a second step 284, the controller 12 starts the flow of the AC from the AC power supply 16 to the first and second electrodes 24 and 26. In a third step 286, the controller 12 monitors the progress of the electrolytic dissolution of the workpiece 52 based on various sensor signals 62 and 64 indicative of the electrolytic dissolution of the workpiece 52. For example, the controller 12 may use an image 210 of the workpiece 52 obtained by the deburring sensor 162 to determine the progress of the electrolytic dissolution. Alternatively, a timer based on experimental data may be used to indicate when electrolytic dissolution is complete. In a fourth step 288, the controller 12 determines whether electrolytic dissolution is complete or not. For example, the controller 12 may compare the image 210 of the workpiece 52 with the baseline material removal image 194 or the timer may expire. In a fifth step 290, if the electrolytic dissolution is not complete, the controller 12 adjusts parameters of the electrolytic dissolution, as necessary, to complete the electrolytic dissolution of the workpiece 52. The process 280 then returns to the step 286 to continue monitoring the progress of the electrolytic dissolution. If the electrolytic dissolution is complete, then in a sixth step 292, the controller 12 stops the flow of the first and second electrolytes 32 and 34 and the flow of the AC from the AC power supply 16. Finally, in a seventh step 294, the deburred and cleaned workpiece 52 is removed from the electrolytic deburring tool 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    an electrolytic deburring tool, comprising:
        a first electrode configured to be positioned at a first gap away from a first edge of a workpiece;
        a second electrode configured to be positioned at a second gap away from a second edge of the workpiece;
        a first electrolyte supply configured to flow a first electrolyte through the first gap between the first electrode and the first edge of the workpiece, wherein the first electrolyte supply comprises a first electrolyte tank configured to contain the first electrolyte;
        a second electrolyte supply configured to flow a second electrolyte through the second gap between the second electrode and the second edge of the workpiece, wherein the second electrolyte supply comprises a second electrolyte tank configured to contain the second electrolyte;
        a power supply configured to flow an alternating current through the first gap and the second gap to cause electrolytic dissolution through the workpiece from both the first edge and the second edge in an alternating manner; and
        a physical barrier configured to isolate the first and second electrolytes from one another.
2. The system of claim 1, wherein the first and second electrodes alternately function as a transient cathode and a transient anode as the alternating current flows toward and away from the first and second electrodes, respectively.
3. The system of claim 2, wherein the electrolytic deburring tool is configured to provide the electrolytic dissolution of the workpiece at the transient cathode and an electrolytic purging of the workpiece at the transient anode.
4. The system of claim 1, comprising a first protective layer configured to cover a first side of the workpiece except for the first edge at the first gap, and a second protective layer configured to cover a second side of the workpiece except for the second edge at the second gap.
5. The system of claim 1, wherein the first and second electrodes are inert.
6. The system of claim 1, wherein the electrolytic deburring tool is a sheet metal deburring tool, and the workpiece is sheet metal.
7. The system of claim 1, wherein the electrolytic deburring tool is a lamination deburring tool, and the workpiece is an insulated lamination.
8. The system of claim 1, wherein the first and second electrolyte tanks are configured to enable the workpiece to extend substantially horizontally between the first electrolyte tank and the second electrolyte tank.
9. The system of claim 8, comprising a first electrolyte system coupled to the first electrolyte tank and a second electrolyte system coupled to the second electrolyte tank, wherein the first electrolyte system and the second electrolyte system each comprise a storage tank, a return tank, a pump, a filter, and a control valve.
10. The system of claim 9, wherein each of the storage tank, the return tank, the pump, the filter, and the control valve of the first and second electrolyte systems comprise non-conductive materials.
11. The system of claim 1, comprising an electrolytic deburring controller configured to control the alternating current through the first gap and the second gap using the power supply.
12. The system of claim 1, wherein the physical barrier comprises a non-conductive material configured to block electrical current from flowing between the first and second electrolyte tanks
13. The system of claim 1, comprising a base disposed between the first and second electrolyte tanks, wherein the base is configured to support the workpiece.
14. The system of claim 1, comprising an insulator block disposed between the first and second electrolyte tanks, wherein the insulator block is configured to maintain a flatness of the workpiece.
15. A method, comprising:
    flowing a first electrolyte through a first electrolyte supply from a first electrolyte tank configured to contain the first electrolyte across a first gap between a first electrode and a first edge of a workpiece;
    flowing a second electrolyte through a second electrolyte supply from a second electrolyte tank configured to contain the second electrolyte across a second gap between a second electrode and a second edge of the workpiece;
    flowing an alternating current across the first gap and the second gap to cause electrolytic dissolution of the workpiece at both the first edge and the second edge in an alternating manner; and
    isolating the first and second electrolytes from one another using a physical barrier.
16. The method of claim 15, comprising alternating electrolytic dissolving of the workpiece when the alternating flows toward the first or second electrode and electrolytic purging of the workpiece when the alternating flows away from the first or second electrode.
17. The method of claim 15, wherein a frequency of the alternating current is less than approximately 1000 Hertz.
18. A system, comprising:
    an electrolytic deburring controller, comprising:
        one or more tangible, non-transitory, machine-readable media collectively storing one or more sets of instructions; and
        one or more processing devices configured to execute the one or more sets of instructions to monitor or control operations of the system to:
            flow a first electrolyte through a first electrolyte supply from a first electrolyte tank configured to contain the first electrolyte across a first gap between a first electrode and a first edge of a workpiece;

flow a second electrolyte through a second electrolyte supply from a second electrolyte tank configured to contain the second electrolyte across a second gap between a second electrode and a second edge of the workpiece; and flow an alternating current across the first gap and the second gap to cause electrolytic dissolution of the workpiece at both the first edge and the second edge in an alternating manner.

19. The system of claim 18, comprising a sensor configured to provide feedback indicative of the electrolytic dissolution of the workpiece to the electrolytic deburring controller.

20. The system of claim 18, comprising a model of a deburred workpiece, wherein the one or more processing devices are configured to execute the one or more sets of instructions to compare the model of the deburred workpiece to the workpiece being electrolytically deburred to determine when to end electrolytic dissolution of the workpiece.

* * * * *

UNITED STATES PATENT AND TRADEMARK OFFICE
CERTIFICATE OF CORRECTION

| | | |
|---|---|---|
| PATENT NO. | : 8,882,986 B2 | Page 1 of 1 |
| APPLICATION NO. | : 13/039295 | |
| DATED | : November 11, 2014 | |
| INVENTOR(S) | : Luo et al. | |

It is certified that error appears in the above-identified patent and that said Letters Patent is hereby corrected as shown below:

On the title page item 56, under "OTHER PUBLICATIONS", in Column 2, Line 2, delete "1243457.5," and insert -- 1203457.5, --, therefor.

In the specification

In Column 8, Line 27, delete "tank 20" and insert -- tank 30 --, therefor.

In Column 10, Line 46, delete "workpiece 56" and insert -- workpiece 52 --, therefor.

In the claims

In Column 12, Line 28, in Claim 12, delete "tanks" and insert -- tanks. --, therefor.

Signed and Sealed this
Ninth Day of August, 2016

Michelle K. Lee
*Director of the United States Patent and Trademark Office*